Aug. 26, 1958 G. A. NEFF 2,849,704

DATA PROCESSING SYSTEM

Filed June 28, 1954 2 Sheets-Sheet 1

INVENTOR.
GLYN A. NEFF

BY James B. Christie

ATTORNEY

Aug. 26, 1958 G. A. NEFF 2,849,704

DATA PROCESSING SYSTEM

Filed June 28, 1954 2 Sheets-Sheet 2

INVENTOR.
GLYN A. NEFF
BY James B. Christie
ATTORNEY 2,849,704

DATA PROCESSING SYSTEM

Glyn A. Neff, Pasadena, Calif., assignor, by mesne assignments, to Consolidated Electrodynamics Corporation, Pasadena, Calif., a corporation of California Application June 28, 1954, Serial No. 439,779

9 Claims. (Cl. 340—174)

This invention relates to data processing systems and, more particularly, to apparatus for generating a signal train including signals representing samples of data and signals representing time.

In data processing systems, including digital computers which are capable of performing numerical computations at an exceedingly fast rate, one limitation on the time to complete a series of computations on variable physical quantities has been the time required to reduce the variable to numerical form for introduction to the computer.

The present invention relates to apparatus for use in a data processing system in which it is desired to sample a variable periodically and provide a numerical indication of each sample taken. It will be appreciated that each of the samples must be reduced to a time base in order to correlate the fluctuations of the variable with other data. One way in which this may be done is to record data samples and representations of time simultaneously. However, this is relatively expensive since it requires two recording systems, one for the time indications and another for the data samples.

On the other hand, where one recording system is used to record time indications and data samples, heretofore it has been necessary to interrupt the recording of the data samples from time to time to record a time indication. This is undesirable because the rate at which the samples are taken cannot be uniform. That is, after a certain number of data samples are taken and recorded, a time indication must be substituted for one or more of the data samples and this leaves a gap in the record within which the fluctuations of the variable are unknown.

In accordance with my invention, I provide apparatus for generating a signal train including signals representing uniformly spaced samples of data along with signals representing time. Data measurements and time measurements are carried on simultaneously and continuously. At the time a first data measurement of a group of samples is made, the corresponding time measurement is transferred to temporary storage. A succession of data measurements are then made in a group. As each of the subsequent data measurements are transferred to a storage medium, such as a drum or magnetic tape, one digit of the time measurement number in temporary storage is transferred in time sequence with the data measurement to the storage medium. Thus, one time measurement consisting of a plurality of digits representing the time reference at the start of a group of data measurements, is interspersed with the successive data measurements as recorded on the storage medium. In this manner data samples can be taken at fixed periodic intervals without interruption, with the digits representing the time at the start of a group of samples being interspersed a digit at a time with the signals indicative of successive samples.

Briefly, the apparatus provides for the registration of a number of significant digits of time, and means for interleaving the time digits between data samples. In one embodiment, a plurality of data digit registers is adapted to register the significant digits of a data sample, a plurality of time digit registers is adapted to register time digits, a common output circuit is connected to a magnetic recording system, and the registrations in the registers are selectively passed to the output circuit, whereby a recording is provided in which the significant digits representing time are interspersed between the significant digits representing a sample of data.

A better understanding of my invention may be had upon a reading of the following detailed description when taken in conjunction with the drawings, in which.

Figure 1:
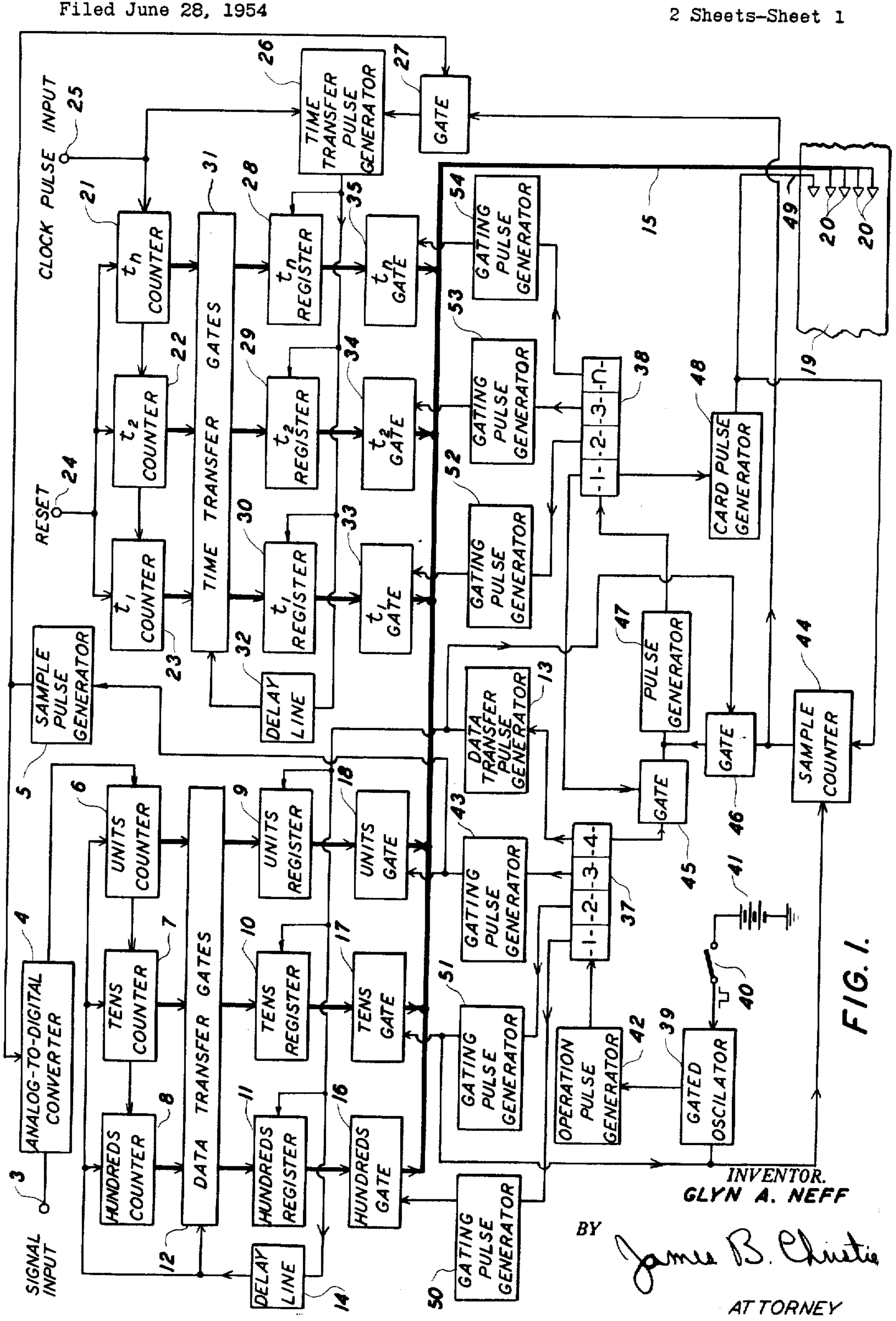
Fig. 1 is a block diagram of one embodiment of my invention.

In Fig. 1 the heavy lines represent signal transfer links which are capable of simultaneously transferring a coded group of electrical signals, as for example, the binary bits of a binary coded decimal permutation group. Although other number systems may be employed, it will be assumed in the discussion of Fig. 1 that the individual digits are handled in a binary coded decimal system of notation, i. e., each of the registers and counters of Fig. 1 may comprise a plurality of sets of bi-stable circuits, each of which is adapted to register a significant decimal digit in binary-coded form of a multi-digit number.

Where one condition of stability of a bi-stable circuit is labeled "1," and another condition of stability of a bi-stable circuit is labeled "0," and where four bi-stable circuits comprise a set or a decade capable of registering a binary coded decimal digit, one satisfactory permutation code is as follows:

| *Number* | *Binary Code* | | | |
|---|---|---|---|---|
| | *1* | *2* | *4* | *8* |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

In Fig. 1, an electrical signal representing a variable may be applied to a signal input terminal 3, from whence it is passed to an analog-to-digital converter 4, which is adapted to provide a train of pulses equal in number to the value of the electrical signal applied to the terminal 3 at the time that a sampling pulse appears from the sample pulse generator 5. The converter may be of a type in which a gating pulse having a width proportional to the magnitude of the analog voltage is generated, the pulse being used to control the time duration in which a gate passes pulses from a suitable pulse generator. Such a converter is described in the book "High-Speed Computing Devices" by the Engineering Research Associate Staff, McGraw-Hill, 1950, page 391. Assuming, for example, that the variable applied to the terminal 3 is equal to 695 units, the analog-to-digital converter 4 is adapted to provide a train of 695 pulses when a sample pulse is supplied by the sample pulse generator 5. The train of pulses is applied to a units counter 6 which is adapted to count from zero to nine. In turn, the units counter 6 is coupled to a tens counter 7, which in like manner is coupled to a hundreds counter 8. By this means, the tens counter 7 increases its registration by one each time the units counter passes through zero, and the hundreds counter 8 increases its registration by one each time the tens counter 7 goes through zero. Binary-coded decimal counters have been described in the book "Arithmetic Operations in Digital Computers" by R. K. Richards, D. Van Nostrand Co., 1955, pages 198–205.

In a conventional permuted binary counter which includes four bi-stable circuits adapted to count from zero to nine in accordance with the permutation code given above, a pulse may be derived from the binary eight registering circuit for actuating the counter of the next higher order whenever the binary eight registering circuit changes its condition of stability from "1" to "0."

After a number is registered in the counters 6, 7 and 8 corresponding to the value of an electrical signal applied to the terminal 3, the numerical registration may be passed to the registers 9, 10 and 11 via the data transfer gates 12. This is accomplished in response to a pulse from a data transfer pulse generator 13, which first clears the registers 9, 10 and 11, and after being delayed by the delay line 14, opens the data transfer gates 12. In addition, the registration in the counters 6, 7 and 8 is cleared so that the counters may receive a next succeeding train of pulses representing the value of the next sample of the variable. The registers 9, 10 and 11 each include four flip-flops for storing the four binary bits of a single binary-coded decimal digit.

In accordance with my invention, the separate significant digits of a data sample registered in binary coded form in the registers 9, 10 and 11 are individually passed to a common output circuit via the hundreds gate 16, the tens gate 17 and the units gate 18. By passing these digits one by one to the common output circuit 15, they may be recorded on a moving tape 19 having a magnetizable coating, by a set of magnetic recording heads 20. It will be appreciated that suitable amplifiers (not shown) may be included in the common output circuit 15 for reinforcing the electrical signals to be recorded.

Figure 2:
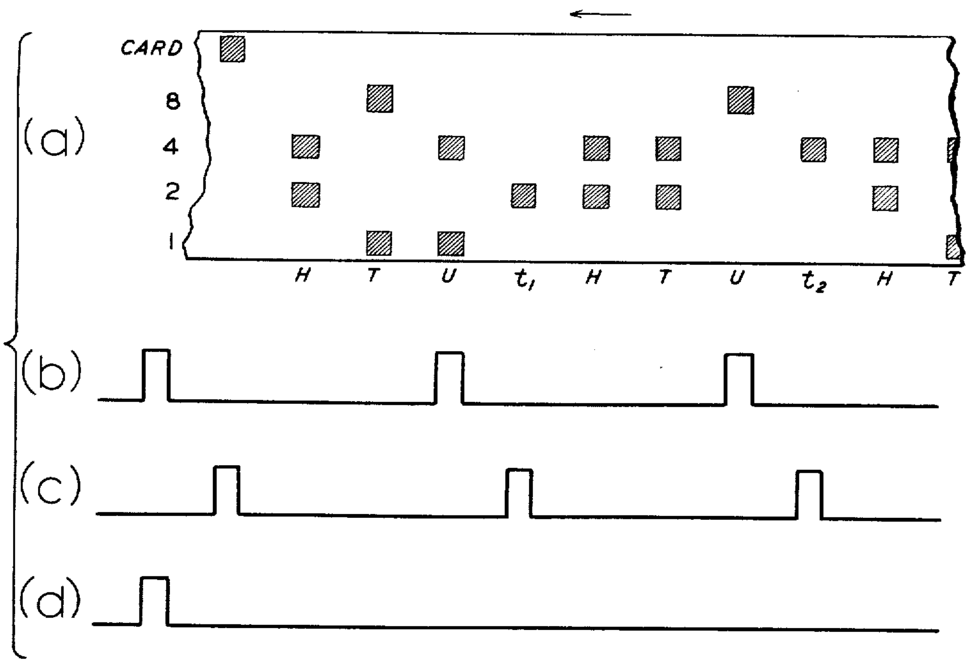
Fig. 2 is a schematic diagram of a magnetic tape, along with a set of graphical representations of signals appearing in the embodiment of Fig. 1.

Again assuming that the sample value was 695 units, and that the order in which the gates 16, 17 and 18 are actuated is hundreds, tens, units, the resulting pattern on the tape 19 is shown diagrammatically in Fig. 2(*a*) as the first sample on the tape of Fig. 2(*a*).

In addition to the data counters 6, 7 and 8, a plurality of time counters, such as indicated at 21, 22 and 23, which are equal in number to $n$ number of significant digits of a number representing a time reference, are adapted to register time. For example, six counters may be used to establish a six-digit time reference number. These counters are identical to the counters 6, 7 and 8 described above. The counters 21–23 may be set to a predetermined registration, say zero, by applying a re-set pulse to the terminal 24. By applying clock pulses to a terminal 25, the counters 21, 22 and 23 may be caused to register continuously a number corresponding to the number of clock pulses applied to the terminal 25. By this means a registration is continuously available in binary-coded decimal form representing a time reference.

When a data sample is to be taken by the analog-to-digital converter 4, and the sample pulse provided by the sample pulse generator 5 is passed to a time transfer pulse generator 26 via a gate 27, the registers 28, 29 and 30 are cleared and a pulse is applied to the time transfer gates 31 via the delay line 32. This causes the registration in the counters 21, 22 and 23 to be transferred to the registers 28, 29 and 30 via the time transfer gates 31. This means that the registration in the registers 28, 29 and 30 corresponds to the time reference number existing on the time counters $t_1 \ldots t_n$ at the instant at which a first sample is taken of the signal applied to the signal input terminal 3 . The separate digits of the time reference number $t_1$, $t_2$, $t_n$ may be selectively passed to the common output circuit 15 at any convenient later time via the time digit gates 33, 34 and 35.

In accordance with my invention, the data digit gates 16, 17 and 18 and the time digit gates 33, 34 and 35 are selectively energized in such a way that a signal train is provided in the common output circuit 15, in which electrical signals representing time digits are time division multiplexed with groups of digits representing data samples.

The magnetic pattern on the magnetizable tape, created in response to a signal train where each digit of time information is interspersed between a complete sample of data, including a hundreds digit, a tens digit, and a units digit, is shown in Fig. 2(*a*). The data gates 16–18 and the time digit gates 33–35 may be selectively energized to produce a desired signal train in the common output circuit 15 by means of a data digit ring counter 37 and a time digit ring counter 38. The rest position of the data digit ring counter 37 is positioned –3–, and the rest position for the time digit ring counter 38 is its position –1–. Any suitable ring counter may be used, such as one of those described in the above-mentioned book by R. K. Richards starting on page 205 thereof.

The operation of the circuitry is initiated by applying a negative pulse to the gated oscillator 39. Although the negative pulse may be supplied from an electronic source, for convenience the source of the negative pulse is indicated by means of a manual switch 40 and a battery 41.

The gated oscillator 39 and the operation pulse generator 42 are adapted to generate a train of operating pulses bearing an accurate time relationship with respect to the negative pulse which initiates the operation of the gated oscillator 39. A conventional shock-excited oscillator may be used as the gated oscillator 39 or the gated oscillator shown in my co-pending United States patent application, filed on June 21, 1954, Serial No. 438,105, may be used.

When a negative pulse is applied to the gated oscillator 39, the data digit ring counter 37 is in position –3–, i. e., its rest position. However, in response to the first of the operation pulses from the operation pulse generator 42, the data digit ring counter 37 shifts to position –4–. This causes a pulse to be emitted from the –3– section which is applied to a gating pulse generator 43, which supplies a gating pulse to the units gate 18.

If there is any registration in the units register 9 at this time, it is passed to the common output circuit 15. However, ordinarily at the beginning of operation, the units register 9 will contain no registration and hence nothing will be passed to the common output circuit 15. In addition, the gating pulse generated by the gating pulse generator 43 is applied to the sample pulse generator 5 which generates a sample pulse for application to the analog-to-digital converter 4 for initiating a sampling operation in which a train of pulses is generated corresponding to the value of an electrical signal applied to the terminal 3 as described above. Also, the output of the sample pulse from the sample pulse generator is passed by the gate 27 to the time transfer pulse generator 26. The gate 27 is held open at this time by a threshold potential derived from the sample counter 44 which at this instant is in its rest position.

In response to a sample pulse from the sample pulse generator 5, the time transfer pulse generator 26 generates a transfer pulse which is first applied to the registers 28, 29 and 30 and then to the time transfer gates 31 via a delay line 32. This causes the registration in the counters 21–23 to be pasesd to the registers 28–30. If it is necessary that the read-out from the counters 21–23 be arranged so that a read-out is never initiated when the registration is changing, a time transfer pulse generator, constructed in accordance with the apparatus shown in my co-pending United States patent application, filed on June 18, 1954, Serial No. 437,835, and entitled "Control Circuit," may be employed.

Therefore, after the first operation pulse has been applied to the data digit ring counter 37, a registration is provided in the data counters 6, 7 and 8 corresponding to the value of the variable applied to the terminal 3, and a registration corresponding to a time reference is passed to the time registers 28, 29 and 30.

In response to the next operation pulse from the operation pulse generator 42, the data digit ring counter 37 assumes position –1–. This causes a pulse to be emitted from the –4– section which is applied to the data transfer pulse generator 13 in response to which the data transfer pulse generator 13 generates a transfer pulse which first clears the data registers 9, 10 and 11 and subsequently energizes the data transfer gates 12 after traversing the delay line 14.

This causes the data registration in the counters 6, 7 and 8 to be passed to and registered in the registers 9, 10 and 11. In addition, a pulse derived from position –4– of the data digit ring counter 37 is applied to a gate 45. At this time, the gate 45 is held closed by a threshold potential derived from section –1– of the time digit ring counter 38. However, a pulse derived from the output of the data transfer pulse generator 13 is passed to the time digit ring counter 38 via a gate 46 and a pulse generator 47.

The gate 46 is held open at this time by a threshhold potential derived from the rest position of the sample counter 44 in a manner similar to the threshold potential which is derived for holding open the gate 27 associated with the time transfer pulse generator 26. This causes the time digit ring counter 38 to assume position –2– and a pulse is emitted from the –1– section, which is passed to a card pulse generator 48, which in turn generates a card pulse which is recorded on the tape 19 by a magnetic recording head 49.

In addition, a pulse from the card pulse generator 48 is applied to the sample counter 44, which pre-sets the sample counter 44 to a selected position which is a number of counts distant from the rest position, equal to the number of samples of a group. For example, where the samples are ultimately to be stored in the form of punched cards, the sample counter 44 may be set to a number removed from the rest position equal to the number of samples which are to be punched in a single card.

The next operation pulse provided by the operation pulse generator 42 causes the data digit ring counter 37 to assume position –2–. This results in a pulse being emitted from the –1– section of the data digit ring counter 37 which is passed to the hundreds gate 16 via a gating pulse generator 50. This opens the hundreds gate 16 and the registration in the hundreds register 11 is passed to the magnetic recording heads 20 via the common output circuit 15. Assuming that the numeral in the hundreds register 11 is six, the pattern recorded on the tape 19 is as shown for the first digit of the first sample on the tape of Fig. 2(*a*).

The next pulse from the operation pulse generator 42 causes the data digit ring counter 37 to assume position –3–, and a pulse emitted from position –2– is applied to a gating pulse generator 51, which in turns opens the tens gate 17, thereby allowing the registration in the tens gate to be passed to the recording heads 20. If the registration in the tens gate is the numeral nine, the pattern on the tape 2(*a*) is as shown for the next succeeding digit after the first hundreds digit.

In addition, a pulse from the gating pulse generator 51 is passed to the gated oscillator 39 which disables the oscillator, leaving the data digit ring counter 37 in its –3– position, i. e., its rest position. Also, a pulse derived from the gating pulse generator 51 is applied to the sample counter 44, which causes the sample counter to assume a position one count nearer its rest position.

The sequence of operations again may be initiated by applying a negative pulse via a switch 40 to the gated oscillator 39, thereby causing an operation pulse to be applied to the data digit ring counter 37. The data digit ring counter 37 assumes position –4– and a pulse is emitted from section –3– which causes the registration in the units register 19 to be passed via the units gate 18 and the common output circuit 15 to the magnetic recording heads 20.

If the registration in the units register is the numeral five, the resulting pattern on the tape of Fig. 2(*a*) will be as shown. Thus, the value of the signal applied to the terminal 3, which was assumed to be 695 units, is recorded in coded form on the tape 19.

At the same time that the units registration is being passed to the recording heads 20, a pulse from the gating pulse generator 43 causes the sample pulse generator 5 to initiate a sampling operation by the analog-to-digital converter 4, and a new data sample is entered in the counters 6, 7 and 8. Since the gate 27 associated with the time transfer pulse generator 26 is closed at this time because the sample counter 44 is not in its rest position, the time registration in the registers 28–30 remains the same as before.

When the next pulse from the operation pulse generator 42 arrives, the data digit ring counter 37 assumes position –1–, a pulse from section –4– is applied to the data transfer pulse generator 13 which in turn clears the registers 9–11 and causes a data sample from the counters 6, 7 and 8 to be passed to the registers 9–11. In addition, a pulse from section –4– of the data digit ring counter 37 is passed to the pulse generator 47 via the gate 45. Since the gate 45 is held open by a threshold potential derived from section –1– of the time digit ring counter 38, which at this time is in position –2–.

The pulse generated by the pulse generator 47 causes the time digit ring counter 38 to assume position –3–, and a pulse generated by section –2– is applied to a gating pulse generator 52 which in turn opens the $t_1$ gate 33, allowing the registration in the $t_1$ register 30 to be passed to the recording heads 20 via the common output circuit 15. If the registration in the $t_1$ register 30 is the numeral two, the resulting recording on the tape is as shown in Fig. 2(*a*).

The next two pulses cause the registration in the hundreds register 11 and the tens register 10 to be recorded, and the data digit ring counter 37 is placed in its rest position. When a negative pulse again is applied to the gated oscillator 39, the signal applied to the terminal 3 is sampled, the time digit ring counter 38 advances to position –$n$– and a pulse from the gating pulse generator 53 opens the $t_2$ gate 34, allowing the registration in the $t_2$ register 29 to be recorded.

The sequence repeats itself with the data samples being recorded and one digit of the time sample until the gating pulse generator 54 opens the $t_n$ gate 35 allowing the least significant digit $t_n$ of the time sample to be recorded. At the time the time digit ring counter 38 assumes its –1– position, the gate 45 is closed, and the data digit ring counter 37 continues to control the sampling and recording of data digits until the sample counter 44 returns to its rest position. At that time, the gate 46 is open and the entire operation repeats itself with a pulse being passed via the gate 46 to the time digit ring counter 38 and a new time sample being passed to the time registers 28–30.

The graphical illustrations of Fig. 2(*a*), (*b*), (*c*) and (*d*) show the relationship between the sample pulse, the data transfer pulse, and the resulting pattern recorded on the magnetic tape 2(*a*). Thus, a sample of data is taken at the time that the registration in the units register 9 is recorded. The registration in the data counters 6–8 is passed to the registers 9–11 at the time when the time digit is being recorded and a number registered in the time counters 21–23 is passed to the time registers 28–30 at a time coincident with the time when the registration in the units register 9 is recorded just prior to a card pulse being emitted by the card pulse generator 48. Also, it may be seen that the time sample is taken at the same instant as the first data sample.

Each of the individual blocks of Fig. 1 may comprise conventional apparatus for accomplishing the indicated function. As noted above, the counters and registers may include sets of bi-stable circuits which are interconnected in such a way as to count and register binary coded numbers. The pulse generators may be of any well known type, although I have found that the blocking oscillator type of pulse generator performs quite satisfactorily. The construction of suitable ring counters is well known to those skilled in the art. For gates, conventional diode gating circuits, sometimes called logical "and" circuits, have been found to perform properly.

The apparatus of my invention has been included in a data processing system in which the recorded magnetic tape is passed to machinery for converting the recorded numbers to perforations in punched cards. Reference is made to the co-pending United States patent application, filed on January 4, 1954, Serial No. 402,126, in the names of Robert L. Sink and Glyn A. Neff, and entitled "Data Processing Apparatus," in which is shown an improved system for this purpose.

By way of summary, the operation of the system will be briefly reviewed. Assume that a variable voltage is applied to the signal input 3. Further assume that the switch 40 is momentarily closed at precise sampling intervals. Every time the switch 40 is momentarily closed, the ring counter 37 is stepped through its four positions starting from the rest position 3. Stepping the ring counter through its four positions successively does four things. First, it actuates the sample pulse generator 5, thereby initiating a sampling of the input signal at 3, which results in a 3-digit number being stored in the counters 6–8 in binary-coded decimal form. Also, the first step results in the transferring of any previous units digit stored in the units register 9 to the tape 19. Second, the sample number stored in the counters 6–8 is transferred to the registers 9–11. Third, the hundreds digit stored in the register 11 is transferred by the hundreds gate 16 to the tape 19. Fourth, the tens digit stored in the register 10 is transferred by the tens gate to the tape 19. The closing of the switch 40 following transfer of the tens digit repeats the cycle.

Simultaneously with the application of the signal input at terminal 3, clock pulses are being applied to the input terminal 25 by means of which the counters 21–23 continuously indicate the number of time intervals which have occurred since an initial time when the counters were reset to zero. Thus, if a reset pulse is applied at a known time, the count existing on the counters always represents the subsequent time interval that has passed, which can be directly related to time by knowing the interval between clock pulses applied to the input 25. For example, the clock pulses may occur at millisecond intervals, in which case the counters indicate the number of milliseconds transpiring since the counters were reset to zero.

At the same time the first sample is taken in response to the output of sample pulse generator 5, the corresponding time measurement established by the counters 21–23 is transferred to the registers 28–30. Thus, a time indication representing the start of the sampling routine is stored in the registers 28–30 from which it can be transferred to the tape 19.

The ring counter 38 successively transfers the time indicative digits from the registers 28–30 to the tape 19 once each sampling cycle, i. e. one time digit is transferred for each cycle initiated by the closing of the switch 40. Thus, one time digit of the number representing the time at the start of a sampling routine is transferred in series with each of the 3 digits representing a sampling number until all the time digits are transferred to the tape 19. For example, if a 6-digit number is used to represent time, requiring six counters, six registers and six gates in the timing portion of the circuit, six samples of the input signal at 3 are made and transferred to the tape 19 before all the digits representing the initial time of the sampling routine are transferred to the tape. Subsequent samples made and transferred to the tape leave blank spaces on the tape between groups of three digits.

The sampling routine may continue for any predetermined number of samples without another time measurement being made. In fact, another time measurement is not made until the sample counter 44 indicates that a predetermined number of samples have been taken. Thus, for example, the sample counter 44 may be preset after switch 40 has been closed twenty times, and thereby a time measurement would be made after every twenty samples are taken of the signal input at 3.

As mentioned above, it may be desired that the information stored on the tape 19 be ultimately transferred to punched cards in a practical working system. It is desirable in such a system to record 20 three-digit number samples on each card together with one six-digit time reference. By reading out the time indication on the counters 21–23 simultaneously with every twentieth sample pulse from the generator 5, a time reference number is made available for transfer to the tape with each group of 20 samples.

I claim:

1. In a data processing system, the combination of a plurality of data registers each of which is adapted to register a significant digit of a sampled variable, a plurality of time registers each of which is adapted to register a significant digit of a time referenced number, a plurality of gates each of which is connected to one of the registers, means sequentially energizing the gates coupled to the data register, means energizing at least one of the gates coupled to the time registers whenever all of the gates coupled to the data registers have been energized, and a common output circuit connected to all of the gates whereby a signal train is provided in which electrical signals representing the registrations in the time registers are time division multiplexed with electrical signals representing the registrations in the data registers.

2. In a data processing system in which a variable is sampled at uniformly spaced periodic intervals in time, means generating a signal train including digital information representing each of the samples and a digital representation of a time reference, the combination of means registering the digital value of the samples, means registering a plurality of significant digits of a number representing a time reference, means coupled to the registers for selectively gating electrical signals representing the digital registrations whereby a signal train is provided in which electrical signals representing the significant digits of the time referenced number are time division multiplexed with the electrical signals representing the sampled variable.

3. In a data processing system, the combination of a plurality of data registers each of which is adapted to register a significant digit of data, a plurality of time registers for registering the significant digits of a number representing a time reference, a common output circuit, means sequentially passing each of the registrations in the data registers to the common output circuit, and means passing the registration in at least one of the time registers to the common output circuit whenever all of the registrations in the data registers have been passed to the output circuit.

4. In a data processing system, the combination of a plurality of registers each of which is adapted to register a significant digit of a number representing a time reference, a source of coded electrical signals representing samples of data, a common output circuit, means selectively passing signals from the source of data representing signals to the output circuit, and means passing an electrical signal corresponding to the registration in at least one of the time registers to the output circuit between the times when the elecrical signals representing samples of data are passed through the output circuit.

5. In a data processing system, the combination of a plurality of data digit registers, a common output circuit, a plurality of time digit registers, a plurality of gates each of which is connected between a single one of the registers and the common output circuit, a data counter having a number of stable conditions equal to the plurality of data digit registers plus at least one, means connecting the gates connected serially with the data digit registers to the data counter whereby the gates may be sequentially opened when the data counter is actuated, a time counter having a predetermined number of stable conditions, means connecting the gates connected serially with the time digit registers to the time counter whereby the gates may be sequentially opened when the counter is actuated, and means connecting the data counter to the time counter for actuating the time counter by at least one count when the data counter achieves a selected condition of operation whereby a signal train appears in the output circuit in which electrical signals representing time digits are time division multiplexed with electrical signals representing data digits.

6. In a data processing system, the combination of a plurality of data digit registers, a plurality of time digit registers, a common output circuit, data gating means connected between the data digit registers and the common output circuit whereby electrical signals representing the data digits may be sequentially passed to the output circuit, time gating means connected between the time digit registers and the common output circuit for passing electrical signals representing at least one of the time digits to the output circuit whenever a selected number of data digits have been passed by the data gating means.

7. In a data processing system, the combination of a plurality of data digit registers, a plurality of time digit registers, a common output circuit, data gating means connected between the data digit registers and the output circuit, time gating means connected between the time digit registers and the output circuit, and means interconnecting the data gating means and the time gating means whereby a signal train is provided in the output circuit in which electrical signals representing the digits are time division multiplexed with electrical signals representing data digits.

8. A data processing system in which coded electrical signals indicative of a group of measured data samples are relayed over one output channel together with coded electrical signals indicative of the time at which the group of data samples was initiated, said apparatus comprising means for storing the signals indicative of one data sample as each sample is measured, means for generating continuously a time reference in the form of a plurality of electrically coded digits, means for sampling and storing simultaneously the electrically coded digits of the time reference signal at the time the first of a group of data samples is taken, means for gating out successively each of the stored data sample indicative signals to the output channel, and means for gating out successive ones of said time reference digits from the time reference sampling and storing means to the output channel following each of the data sample indicative signals, whereby the coded signals for each digit of the time reference are interpersed with successive data sample signals in each group of data samples.

9. In a data processing system, the combination of a source of coded signals representing sampled values of a variable, a source of coded signals representing each of the significant digits of a time referenced number, gating means coupled to each of the sources, and means coupled to the time reference number source by said gating means for storing the coded signals indicative of the digits of the time reference number at the instant the gating means is opened, means for opening said gating means to transfer a time reference number to the storing means simultaneously with the gating out of one of the coded signals representative of the sampled values, and means for alternately gating a coded signal representative of a sampled value of the measured variable from said source and a coded signal representative of a portion of the stored time reference number to a common output channel.

References Cited in the file of this patent

UNITED STATES PATENTS

| | | |
|---|---|---|
| 2,357,297 | Wack et al. | Sept. 5, 1944 |
| 2,539,623 | Heising | Jan. 30, 1951 |
| 2,584,997 | Ferguson | Feb. 12, 1952 |
| 2,689,950 | Bayliss et al. | Sept. 21, 1954 |